United States Patent [19]

Tsukagoshi

[11] 3,764,084

[45] Oct. 9, 1973

[54] PINCH ROLLER FOR ENDLESS TAPE CARTRIDGE

[75] Inventor: Tsunehiro Tsukagoshi, Tokyo, Japan

[73] Assignee: Mondo Kabushiki Kaisha, Tokyo, Japan

[22] Filed: Oct. 14, 1971

[21] Appl. No.: 189,278

[30] Foreign Application Priority Data

Oct. 15, 1970 Japan .............................. 45/101838

[52] U.S. Cl. .......................... 242/55.19 A, 226/187

[51] Int. Cl. ........................ B65h 17/48, B65h 17/20

[58] Field of Search ............. 242/55.19 A, 55.19 R, 242/197, 198, 199, 200; 226/187, 186, 191, 192, 118

[56] References Cited

UNITED STATES PATENTS

| | | | |
|---|---|---|---|
| 3,572,568 | 3/1971 | Lutz | 242/55.19 A |
| 3,620,467 | 11/1971 | Isom | 242/55.19 A |
| 3,489,362 | 1/1970 | Linning | 242/55.19 A |
| 3,559,908 | 2/1971 | Esashi | 242/55.19 A |
| 3,606,191 | 9/1971 | Ban | 242/55.19 A |

*Primary Examiner*—Billy S. Taylor
*Attorney*—Sughrue, Rothwell, Mion, Zinn & Macpeak

[57] ABSTRACT

A tape cartridge has a pinch roller with a dual surface. One surface is driven by a capstan of a tape player, while the other surface of smaller diameter drives the tape. A notch in the side housing of the tape cartridge permits a retention roller to bias a spring biased arm that carries an auxiliary roller into a play position where the tape is biased against the pinch roller.

6 Claims, 1 Drawing Figure

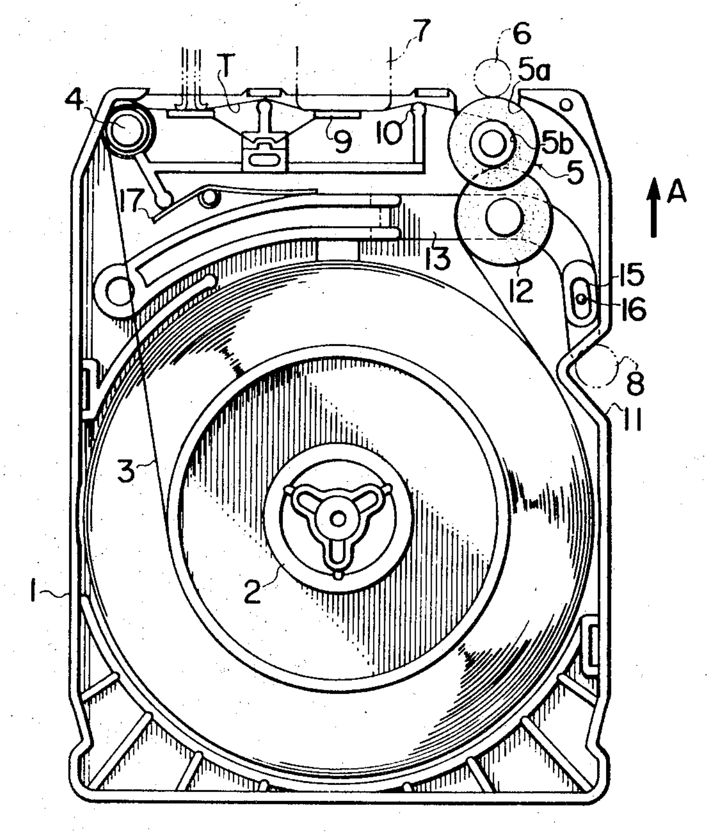
7
6
5a
T
4
9
10
5b
5
A
17
13
15
12
16
8
11
3
2
1

PINCH ROLLER FOR ENDLESS TAPE CARTRIDGE

BACKGROUND OF THE INVENTION

1. Field of the Invention

The present invention is directed to a magnetic tape cartridge and more particularly to a novel cartridge construction that is capable of playing tapes at a lower speed than that of a conventional cartridge.

2. Description of the Prior Art

Generally, tape cartridges which are utilized for example in eight track stereo tape players provide a direct ratio tape speed related to the rotational speed of the capstan. The prior art tape cartridge is generally of a complex configuration and is relatively costly to manufacture and assemble. The persistent problem associated with the prior art tape cartridges has been the deterioration of rollers due to the necessity of providing a constant bias pressure against the rollers.

SUMMARY OF THE INVENTION

The present invention provides a relatively simple tape cartridge construction where the tape is played at a speed lower than that of the conventional cartridge which utilizes a direct ratio of capstan speed to roller speed. The present invention provides an auxiliary pinch roller for tape speed adjustment which urges the cartridge tape against a small diameter portion of the pinch roller provided in the cartridge only when the cartridge is inserted into a play position in the tape player. When the cartridge is released from the play position, the auxiliary pinch roller is released so as to prevent any deformation of the pinch rollers. The pinch roller of the present invention provides a dual surface construction, with one surface being driven by the capstan, while the second surface is of a smaller diameter and actually drives the tape at a lower speed than that of the conventional cartridge.

BRIEF DESCRIPTION OF THE DRAWINGS

The present invention will become more apparent from the following description of the preferred embodiment taken in conjunction with the accompanying drawing in which the drawing discloses a horizontal cross-sectional view of the tape cartridge.

DESCRIPTION OF THE PREFERRED EMBODIMENTS

Referring to the drawing, the tape cartridge of the present invention comprises a housing 1 carrying a reel 2 suitably mounted to rotate with an endless tape which is pulled off the inner convolution and is returned to an outer convolution. The elongated portion T of tape 3 is extended between a guide post 4 and a pinch roller 5. A reproducing transducer head 7 is partially shown in the drawing, while capstan 6 is utilized to drive the pinch roller 5. A tape pad 9 presses the tape T against the transducer head 7 while guide pin 10 guides the tape as it leaves the transducer head 7. On one side of the housing 1, a V-shaped notch 11 is provided with which a retention roller 8 engages and latches the tape cartridge firmly into its play position when inserted into a tape player.

The pinch roller 5 that is driven by the capstan 6 has a dual surface, the first surface is a contacting surface portion *5a* that has an identical diameter with a pinch roller of a conventional cartridge, and therefore, is adapted to be engaged by the capstan 6 without any modifications. The second surface is a driving surface portion *5b* that has a smaller diameter than the contacting surface portion *5a* and is capable of driving the tape T at a lower speed than that of the conventional cartridge. An auxiliary roller 12 presses the tape portion T against the driving surface portion *5b* of the pinch roller 5 to drive the tape T. The auxiliary roller 12 is rotatably mounted on a pivot arm 13 and is capable of pivotal movement with the pivot arm 13. One end of the pivot arm 13 is pivotably secured to the cartridge for pivotal movement in the horizontal plane and the pivot arm 13 is biased in the clockwise direction by a spring 17. The other end of the pivot arm 13 is projected into the V-shaped notch portion 11 of the housing 1 beneath the pinch roller 5 and is guided by a slot 15. A stopper pin 16 rides within the slot 15 so as to limit the pivotal movement of the pivot arm 13 in the clockwise direction.

The operation of the cartridge of the present invention is as follows, when the tape cartridge is inserted into a play position in a tape cartridge player, a spring member (not shown) biases the retention roller 8 into engagement with the inclined surface of the V-shaped notch 11 provided on the side of the tape cartridge housing 1. The retention roller 8 pushes the projected end portion of the pivot arm 13 in the direction of the arrow A so that the auxiliary roller 12 presses the elongated portion T of the tape 3 against the driving surface portion *5b* of the pinch roller 5. Consequently, the contacting surface portion *5a* of the pinch roller 5 is pressed against the capstan 6 to rotate the pinch roller 5. The tape 3 is driven along the elongated portion T which is pinched between the driving surface portion *5b* of the pinch roller 5 and the auxiliary roller 12. If, for example, the tape of the conventional cartridge is driven at 9.5 centimeters per second with the standard player device, the pinch roller 5 of the cartridge of the present invention may also be driven to rotate at the same speed by the capstan 6 of the same player device.

The pinch roller of the cartridge of the present invention, however, has a driving surface portion *5b* with a smaller diameter than that of the contacting surface portion *5a* for engagement with the capstan 6, and the driving surface portion *5b* engages with the tape 3. Accordingly, the tape driving speed of the present invention will be lower than that of the conventional cartridge.

When the cartridge is withdrawn from the play position in the tape player, the engagement between the projected end portion of the pivot arm 13 and the retention roller 8 is released, and consequently, the engagement of the auxiliary roller 12 rotatably mounted on the pivot arm 13 with the driving surface portion *5b* of the pinch roller 5 through the tape T may also be released.

With the tape cartridge construction of the present invention, therefore, it is possible to permit the tape to be driven at a lower speed than that of the conventional cartridge. Accordingly, the quantity of recordings, such as the number of individual songs may be increased from that of an identical reel of a conventional tape cartridge.

Furthermore, since the auxiliary roller 12 of the present invention is pressed against the driving surface portion *5b* through the tape only when inserted in the playing position in the player and is not pressed when in the non-playing position, the driving surface portion or the auxiliary roller will not be deformed even if it is made of elastic material such as rubber and therefore, there will be no deterioration of tone quality due to a deformation.

The operation of the auxiliary roller described above may be accomplished only upon insertion and removal of the cartridge from the player and there is no necessity to provide a spring to press the auxiliary roller against the pinch roller or any other element thus permitting the tape cartridge to be constructed in the simplest manner.

The pinch roller of the present invention has as described above, a pair of dual surfaces in which the contacting surface portion may be composed of rubber at the periphery and the driving surface portion may be composed of a metal material. Likewise, the auxiliary roller may be composed of a relatively hard material, such as metal, while the pinch roller may be made entirely of an elastic material, such as rubber.

While the above describes the preferred embodiment of the present invention, it is clear that various modifications can be made by those skilled in the art and accordingly, the scope of the present invention should be measured solely from the following claims.

What is claimed is:

1. In an endless tape cartridge for playing a magnetic recording tape by insertion of the same into a tape player, said tape cartridge including;

a housing having an indented surface portion along a side parallel to the direction of insertion;

a reel rotatably mounted in said housing for storing said tape;

means for driving the tape including a pinch roller having a first surface adapted to be driven by a capstan and a second surface for driving the tape, with the diameters of the first and second surfaces being unequal, and wherein said tape player includes a spring biased retention roller engaging said indented surface portion of said housing upon full insertion of said cartridge into said player, the improvement comprising:

a pivot arm rotatably secured to said housing, with one end of said pivot arm projecting from said housing into the indentation formed by said indented surface portion; and an auxiliary roller rotatably mounted on said pivot arm and capable of pressing the tape into driving position against the second surface of the pinch roller when said endless tape cartridge is inserted into play position within said player with said retention roller contacting said one end of said pivot arm to press said auxiliary roller toward said pinch roller.

2. An endless tape cartridge as in claim 1, wherein the pivot arm is provided with a slot and a guide pin extends into the slot for controlling the movement of the pivot arm.

3. An endless tape cartridge as in claim 2, where a spring biases the pivot arm.

4. An endless tape cartridge as in claim 3, where the pivot arm has a C-shape with the free end of the pivot arm extending relatively parallel with the housing side as it enters the indented portion.

5. An endless tape cartridge as in claim 4, where the first surface of the pinch roller is rubber and has a larger diameter than the second surface which is metal.

6. An endless tape cartridge as in claim 5, where the auxiliary roller is rubber.

* * * * *